(12) United States Patent
Nandakumar et al.

(10) Patent No.: US 9,715,421 B2
(45) Date of Patent: Jul. 25, 2017

(54) WRAPPED APPLICATIONS PROVIDING OPERATIONAL INSIGHT TO USERS BASED ON RULES FOR ACCEPTABLE OPERATIONAL STATE PERFORMANCE

(71) Applicant: CA, INC., New York, NY (US)

(72) Inventors: Vikrant Nandakumar, Thanisandra (IN); Madhusudhan Ganda, Kadapa (IN); Hemanth Kumar Pinninti, Bobbili (IN); Naveen Harry Michael, Vijinapura (IN)

(73) Assignee: CA, INC., Islandia, NY (US)

( * ) Notice: Subject to any disclaimer, the term of this patent is extended or adjusted under 35 U.S.C. 154(b) by 63 days.

(21) Appl. No.: 14/835,451

(22) Filed: Aug. 25, 2015

(65) Prior Publication Data

US 2017/0060653 A1 Mar. 2, 2017

(51) Int. Cl.
*G06F 11/00* (2006.01)
*G06F 11/07* (2006.01)
*G06F 11/34* (2006.01)

(52) U.S. Cl.
CPC ........ *G06F 11/079* (2013.01); *G06F 11/0706* (2013.01); *G06F 11/0751* (2013.01); *G06F 11/0772* (2013.01); *G06F 11/0793* (2013.01); *G06F 11/3409* (2013.01); *G06F 11/3452* (2013.01)

(58) Field of Classification Search
CPC ............ G06F 11/3409; G06F 11/079; G06F 11/3452; G06F 11/3466; G06F 11/3612; G06F 11/3616
See application file for complete search history.

(56) References Cited

U.S. PATENT DOCUMENTS

| 6,523,027 | B1* | 2/2003 | Underwood | G06F 9/465 |
| 7,100,195 | B1* | 8/2006 | Underwood | G06F 9/4443 707/999.009 |
| 8,892,960 | B2* | 11/2014 | Sambamurthy | G06F 11/079 714/47.3 |
| 2006/0280236 | A1* | 12/2006 | Rhee | H04M 3/247 375/222 |
| 2007/0043860 | A1* | 2/2007 | Pabari | G06F 9/5072 709/224 |
| 2011/0145795 | A1* | 6/2011 | Khanapurkar | G06F 11/3414 717/126 |
| 2011/0213829 | A1* | 9/2011 | Concini | G06F 9/547 709/203 |

(Continued)

*Primary Examiner* — Charles Ehne
(74) *Attorney, Agent, or Firm* — Sage Patent Group

(57) ABSTRACT

A method includes performing operations on a processor of an application analysis computer. The operations include receiving state performance metrics reported by user terminals via a data network. Each of the state performance metrics indicating a measurement of performance of one of a plurality of operational states of an application processed by one of the user terminals. The operations further include determining when one of the state performance metrics reported by one of the user terminals violates a rule for acceptable operational state performance of the application, and communicating a response message to the one of the user terminals responsive to the determination that the one of the state performance metrics violates the rule. Related operations by a user terminal are disclosed.

18 Claims, 7 Drawing Sheets

(56) References Cited

U.S. PATENT DOCUMENTS

| | | | |
|---|---|---|---|
| 2011/0231828 A1* | 9/2011 | Kaulgud | G06F 11/3616 717/131 |
| 2016/0105328 A1* | 4/2016 | Cooper | G06F 3/0484 715/736 |
| 2017/0010952 A1* | 1/2017 | Nandakumar | G06F 8/70 |

* cited by examiner

US 9,715,421 B2

WRAPPED APPLICATIONS PROVIDING OPERATIONAL INSIGHT TO USERS BASED ON RULES FOR ACCEPTABLE OPERATIONAL STATE PERFORMANCE

BACKGROUND

The present disclosure relates to computing systems, and, in particular, to management of application programs processed by user terminals.

Users can install a myriad of different types of application programs (also commonly referred to as "applications" and "apps") on user terminals having widely varying software and hardware characteristics. For example, users can select from among several million different applications available on various application servers for downloading to cellular telephones (sometimes called "smart phones"), tablet computers, laptop computers, and other types of user terminals for processing. Over a billion Apple IOS user terminals and Android user terminals are presently being used throughout the world.

Application operational behavior can be highly unpredictable from a user perspective. An application may appear to be operating incorrectly, responding sluggishly, and/or crashed (e.g., not responding to user input). There are many reasons application operation can become unpredictable. A user may provide erroneous input to the application or may not be able to effectively operate the application. Application operation requires access to resources located on the user terminal and which can also be remotely located in network servers or other networked devices. Other applications executing on the mobile terminal and communication problems can delay or prevent application access to such resources. Moreover, users are able to limit resource permissions of an application, which can further interfere with application operation. Such operational unpredictability detracts from the user's experience and can result in low application usage and poor recommendations to others.

SUMMARY

Some embodiments of the present disclosure are directed to a method of performing operations on a processor of an application analysis computer. The operations include receiving state performance metrics reported by user terminals via a data network. Each of the state performance metrics indicating a measurement of performance of one of a plurality of operational states of an application processed by one of the user terminals. The operations further include determining when one of the state performance metrics reported by one of the user terminals violates a rule for acceptable operational state performance of the application, and communicating a response message to the one of the user terminals responsive to the determination that the one of the state performance metrics violates the rule.

Some other embodiments of the present disclosure are directed to a method of performing operations on a processor of an user terminal, and communicating the state performance metrics to an application analysis computer via a data network. The operations include generating state performance metrics. Each of the state performance metrics indicating a measurement of performance of one of a plurality of operational states of an application processed by the user terminal. The operations further include receiving a response message responsive to one of the state performance metrics for one of the operational states being determined to violate a rule for acceptable operational state performance of the application, and controlling operation of the application during the one of the operational states responsive to content of the response message.

Other methods, application analysis computers, and/or user terminals according to embodiments of the present disclosure will be or become apparent to one with skill in the art upon review of the following drawings and detailed description. It is intended that all such additional methods, application analysis computers, and/or user terminals be included within this description, be within the scope of the present inventive subject matter, and be protected by the accompanying claims. Moreover, it is intended that all embodiments disclosed herein can be implemented separately or combined in any way and/or combination.

BRIEF DESCRIPTION OF THE DRAWINGS

Other features of embodiments will be more readily understood from the following detailed description of specific embodiments thereof when read in conjunction with the accompanying drawings, in which.

DETAILED DESCRIPTION

In the following detailed description, numerous specific details are set forth in order to provide a thorough understanding of embodiments of the present disclosure. However, it will be understood by those skilled in the art that the present invention may be practiced without these specific details. In other instances, well-known methods, procedures, components and circuits have not been described in detail so as not to obscure the present invention. It is intended that all embodiments disclosed herein can be implemented separately or combined in any way and/or combination.

As explained above, applications executed by user terminals can have highly unpredictable operational behavior. Because the unpredictable behavior is oftentimes due to internal resource conflicts within the user terminal, users have no visibility into why an application is performing sluggishly, not responding, and/or appearing to otherwise operate improperly. Some applications may be configured to respond to a transaction taking too long by, irrespective of the underlying cause, displaying a graphical wait symbol or filling in a progress bar, and/or displaying generic statements such as "unable to process a request please try again," "booking failed," "payment unsuccessful," etc. Users may improperly assume that they have entered improper data, improperly operated the application, and/or conclude the application is programmatically flawed. However, the problem may arise due to insufficient or lack of network communication bandwidth between the user terminal and a remote network server, insufficient internal memory, insufficient processor bandwidth, and/or blocked or unavailable access to user terminal resources such as GPS receiver, Wi-Fi transceiver, cellular transceiver, camera, Internet resource, contact information repository, etc. These and other incorrect assumptions by the user detract from the user's experience with application.

Some embodiments of the present disclosure are directed to generating and providing run time contextual insights to users identifying an underlining basis for a problem being experienced by an application executed by a user terminal. Some additional or other embodiments of the present disclosure are directed to triggering remedial actions by the user terminal to attempt to remedy the problem experienced by the application.

Figure 1:
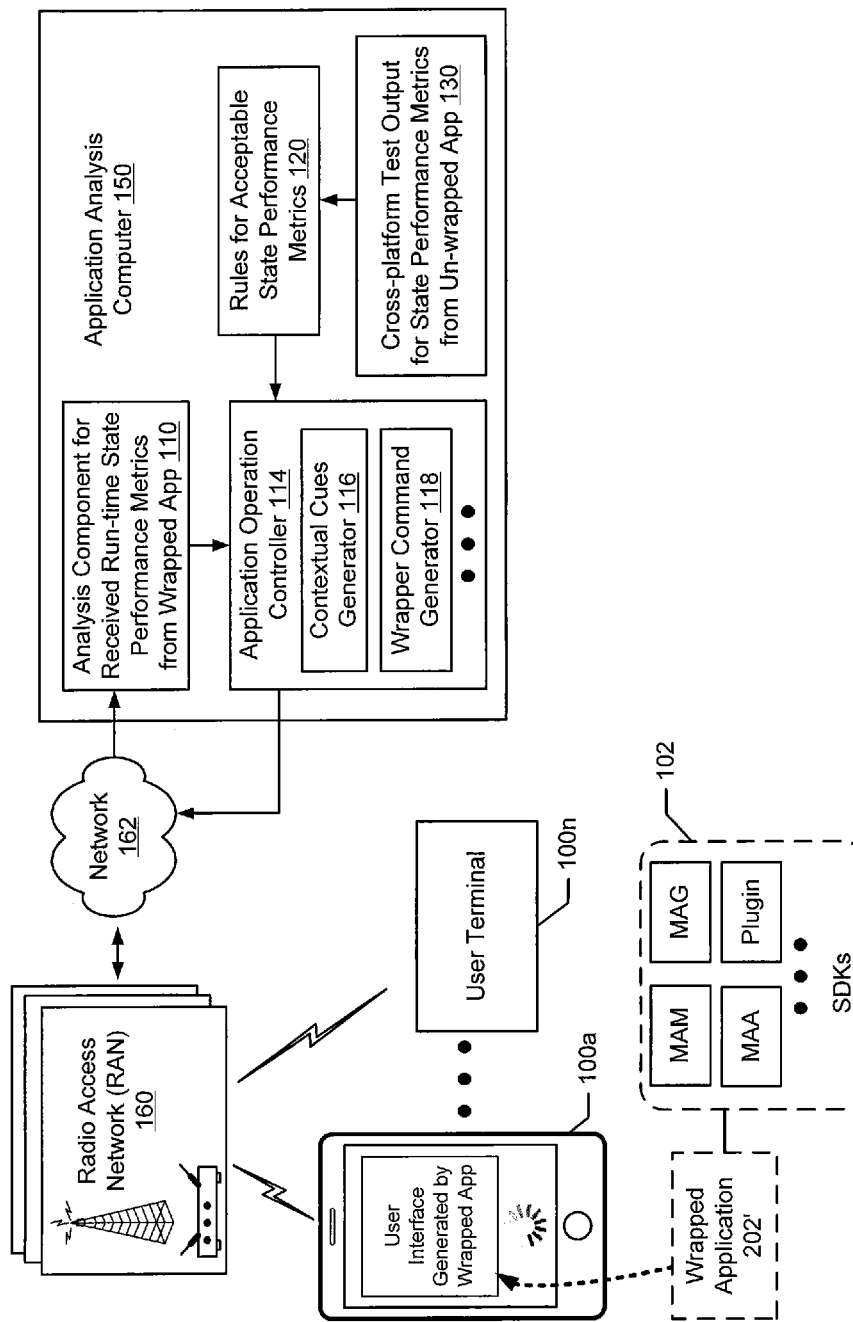
FIG. 1 is a block diagram of a system for generating rules for acceptable state performance metrics from an application and providing contextual insights and/or control operation based on the rules, in accordance with some embodiments of the present disclosure.

FIG. 1 is a block diagram of a system for generating rules for acceptable state performance metrics from an application and providing contextual insights and/or control operation based on the rules, in accordance with some embodiments of the present disclosure. The system includes user terminals 100a-100n, radio access networks (RAN) 160, and an application analysis computer 150 configured according to some embodiments of the present disclosure. The user terminals 100a-100n can download application programs from an application server. The application server may, for example, include the Apple application store server (e.g., iTunes) and/or one or more of the Android application store server (e.g., Google Play and/or Amazon Appstore). The application programs can include gaming programs, spreadsheet programs, multimedia programs, word processing programs, database programs, presentation programs, etc.

The user terminals 100a-100n may communicate through a wireless and/or wired network connection via a data network 162 with the application analysis computer 150 and the application server. For example, one or more of the user terminals 100a-100n may communicate through the radio access networks 160 using one or more wireless communication protocols that may include, but are not limited to, LTE, WLAN (IEEE 802.11), WiMax, and/or Bluetooth.

Although FIG. 1 illustrates a certain number of system components for ease of illustration and explanation, it is to be understood that embodiments of the present disclosure are not limited to the illustrated configuration but instead are intended to encompass any configuration capable of carrying out at least some of the operations described herein.

The application analysis computer 150 includes a repository 120 of rules for acceptable state performance metrics they can be exhibited during various defined operational states of an application during execution by user terminals. The rules are generated based on receiving state performance metrics output (block 130) from run-time tests of the application processed by a plurality of user terminals having different hardware and software platforms (e.g., cross-platform testing). The application is tested without having been wrapped by a wrapper program configured to intercept application programming interface (API) calls by the application to resources of the user terminals. Each of the state performance metrics indicates a measurement of performance of one of a plurality of operational states of the application while operating free of any application wrapper configured to intercept API calls from the application to resources of the user terminals.

For each of the operational states of the application, the rules repository 120 generates a rule for acceptable performance of the operational state of the application based on the state performance metrics for the operational state received from the pre-wrapper run-time tests, and stores the rules each associated with an identifier for a corresponding one of the operational states of the application tested by the pre-wrapper run-time tests.

The rules can be generated based on state performance measurements performed on the application being executed on user terminals having different hardware and/or software configurations. For example, the different hardware configurations can include different random access memory capacities, different memory space allocations for use by the application, different network communication technologies available for use by the application (e.g., Bluetooth, WiFi, cellular 3G, cellular 4G LTE, etc.), different permission settings for resources are available for use by the application (e.g., contact information repository, GPS location, Wi-Fi transceiver, cellular transceiver, Bluetooth transceiver, front-facing camera, back-facing camera, speaker, microphone, etc.).

The rules can then be generated based on mathematical combinations of the state performance metrics generated for the various different hardware and/or software configurations of user terminals. For example, a rule for an acceptable state performance metric for a particular one of the operational states of an application may be generated by mathematically combining the state performance metrics for the operational state to generate a threshold value representing a boundary limit for acceptable performance of the operational state. The mathematical combining may include generating a statistical representation of a boundary identified from the reported state performance metrics for what a reasonable response time is to an API call from the application to a particular type of resource. The threshold value can be defined based on the boundary.

In one embodiment, the threshold value represents a maximum wait time the application is to wait to receive a response to an API call by the application in one of the operational states. In another embodiment, the threshold value represents a maximum latency allowed for a response to be provided to the application programming interface call by the application in one of the operational states. In some other embodiments, a first rule identifies a minimum display update rate that needs to be performed by the application during a first one of the operational states without violating the first rule, a second rule identifies a minimum processor bandwidth available for use by the application while operating in a second one of the operational states without violating the second rule, a third rule identifies a minimum memory space available for use by the application while operating in a third one of the operational states without violating the third rule, and a fourth rule identifies a minimum network bandwidth available for use by the application while operating in a fourth one of the operational states without violating the fourth rule.

With continued reference to FIG. 1, each of the user terminals 100*a*-100*n* include a wrapped application 202' formed by an application wrapper that encapsulates application code, as described below with regard to FIGS. 2-5. The application wrapper is configured to generate and report performance state metrics during execution of the various operational states of the application by the user terminal. The wrapped application 202' may be generated using a software development kit (SDKs) 102, which can include mobile application management (MAM) instrumentation code that encapsulates an application to apply and/or enforce security policies, mobile application analytics (MAA) instrumentation code that encapsulates an application to track and report user operations performed during execution of the application, mobile application gateway (MAG) code that protects application programming interface calls responsive to polices predefined by users, and/or plug-in code that is embedded within the application.

The wrapper may "wrap around" the application to intercept or otherwise observe application programming interface (API) calls from the application to other applications processed by the user terminal, an operating system processed by the user terminal, and/or other software/hardware resources of the user terminal. As used herein, an "API request" can be any signaling occurring from one to another software application that may be performed using a defined syntax and one or more parameters (e.g., data structure, object classes, and/or variables) to obtain data therefrom and/or to provide data thereto. For example, SOAP and REST service requests can be performed using a defined API library of remote calls or other types of API requests.

The wrapped application 202' measures operation of individual ones of a plurality of defined operational states of the application during execution by the user terminal, based on the observed calls from the application to resources of the user terminal and/or based on system events provided by the operating system to the application. The wrapped application 202' generates state performance metrics based on the measurements. Each of the state performance metrics indicates a measurement of performance of one of a plurality of operational states of the application. The wrapped application 202' communicates the state performance metrics to the application analysis computer 150 via a radio access network 160 and the data network (e.g., Internet, private network, etc.).

The types of measurements of an operational state of the application that can be performed by the wrapper to generate a state performance metric may include, but is not limited to, any one or more of the following:
 1. latency for a response to be provided to an application programming interface call by the application;
 2. an elapsed time waiting without having received a response to an application programming interface call by the application;
 3. application utilization of processor resources;
 4. application utilization of memory resources;
 5. rate of information displayed by the application on a display device of the user terminal;
 6. application utilization of network communication resources; and
 7. communication latency between the application and another application and/or a network node through a network interface of the user terminal.

A state performance metric may identify the measurement value (e.g., latency, elapsed time, and/or resource utilization) and/or may include a screen shot captured from a user terminal display or sub-window associated with the application, video captured from the user terminal display or sub-window associated with the application, a geographic region of the user terminal while the application program 106 is being processed, and/or characteristics of the hardware platform (e.g., processor type, volatile memory space, non-volatile memory space, network interface identification, etc.) and/or software platform (e.g., operating system type and version, identification of resident applications and versions, identification of presently executing applications, etc.) of the user terminal.

The application analysis computer 150 includes an analysis component 110 that receives state performance metrics reported by the user terminals 100*a*-100*n*, where each of the state performance metrics indicates a measurement of performance of one of a plurality of operational states of an application processed by one of the user terminals, e.g., 100*a*. The analysis component 110 determines when one of the state performance metrics reported by one of the user terminals 100*a* violates a rule for acceptable operational state performance of the application. An application operation controller 114 communicates a response message to the one of the user terminals 100*a* responsive to the determination that the one of the state performance metrics violates the rule. As will be explained in further detail below, the controller 114 may include a generator 116 that generates contextual cues that indicate a root cause of the problem experienced by the application, and/or a generator 118 that generates a command to control operation of a wrapper that encapsulates (wraps) the application.

The analysis component 110 may modify the rules over time based on analysis of the state performance metrics reported over such time by the user terminals 100*a*-100*n* from measurements during particular operational states of the wrapped application. Thus, for example, a threshold value for an acceptable response latency observed from run-time tests of the unwrapped application can be subsequently modified responsive to state performance metrics reported over time by the user terminals 100*a*-100*n* for the response latencies measuring during operation of a particular operational state of the application while wrapped by an application wrapper. The effect of the application wrapper on execution of the application and related effect on the reasonable boundary of acceptable operations can be determined and used to modify or update the rule associated with that operational state.

Various operations are now described in the context of FIGS. 2-5 for generating the wrapped application 202' and operations performed by a wrapper that encapsulates an application.

Figure 2:
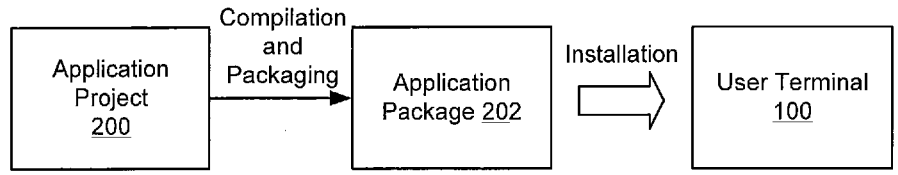
FIG. 2 is a block diagram illustrating an example development flow for an application developed using the Android operating system and distributed in a package file, such as an Android Package File.

FIG. 2 is a block diagram illustrating an example development flow for an application developed using the Android operating system and distributed in a package file, such as an Android Package File. An application project 200 includes various files needed to build an application, including source code, libraries, resources, and certificates. The source code is compiled into binary executable code that is packaged along with the associated resources and manifest into an application package 202.

An application is typically written in a high level programming language, such as Java. During compilation and packaging, the source code may be first compiled into a binary format and then converted into a format appropriate for the operating system on which the application is to be used. For example, for a Java application running on an Android platform, the source code is first compiled into class files in the Java bytecode format, which are then converted into ".dex" files in the Dalvik bytecode. The Dalvik bytecode is the native format of the Android operating system.

The application package 202, such as an Android Package in the ".apk" format, is then generated including the binary program code in ".dex" files, along with associated resources and a manifest file. During installation onto a user terminal 100, the operating system of the user terminal 100 reads the manifest file and unpacks and installs the program code and associated resources from the .apk file on the user terminal 100. The user terminal 100 may be an end-user device such as a smart phone, tablet computer, laptop computer, desktop computer, appliance terminal (e.g., thermostat), etc.

Figure 3:
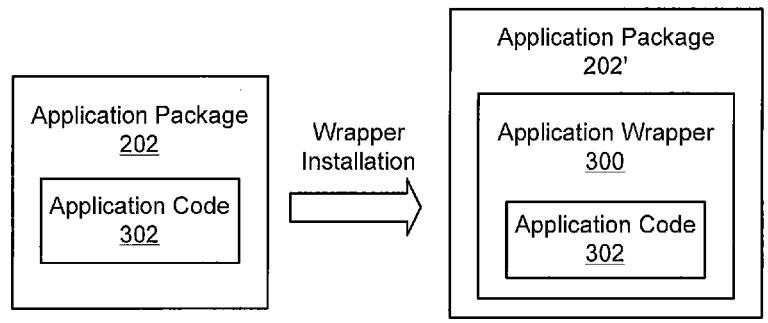
FIG. 3 is a block diagram illustrating installation of an application wrapper that encapsulates application code.

Installation of an application wrapper is illustrated in FIG. 3. As shown therein, before wrapping, an application package 202 includes application code 302. The modified application package 202' is generated to include the application wrapper 300 installed "around" to encapsulate the application code 302. The application code 302 is typically modified to include hooks (program code) that facilitate integration with the application wrapper 300. When the application package 202' is installed on a user terminal 100, the operating system installs the application code 302 wrapped by the application wrapper 300 onto the user terminal 100.

Figure 4:
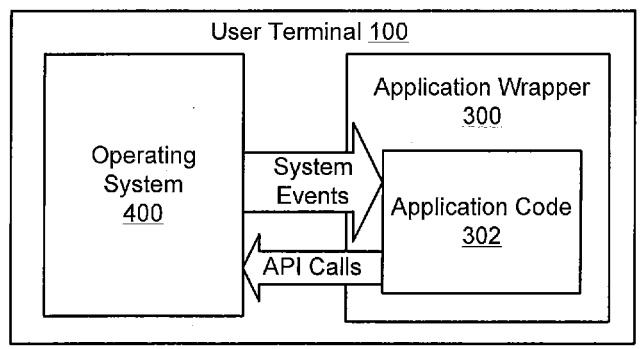
FIGS. 4 and 5 are block diagrams illustrating operation of an application wrapper encapsulating application code.

FIG. 4 illustrates operation of the application wrapper 300 encapsulating the application code 302 on a user terminal 100 which includes an operating system 400. The operating system 400 notifies the application code 302 of system events associated with the application. A system event is an action of the system that must be handled by the application code 302, such as "launch app", "OnStart", "OnStop", etc. For example, the operating system 400 may generate a "launch app" event in response to a user tapping on an app in the user interface of the user terminal 100. System events are processed by a responsive function in the application code 302. When an application wrapper 300 is installed, however, the application wrapper 300 may monitor (e.g., intercept) system events and determine if an action should be taken in response to the system event. For example, the application wrapper 300 may record the system event, generate a notification in response to the system event, etc. Moreover, in accordance with various embodiments, the application wrapper 300 generates state performance metrics, where each of the state performance metrics indicates a measurement of performance of one of a plurality of operational states of an application processed by the user terminal 100.

The logic of the application wrapper 300 may also determine whether or not the system event should be passed along to the application code 302. Accordingly, the application wrapper 300 may implement logic that monitors for system events provided to the application code 302. Note that the responsive function of the application code 302 may be left in place to processes system events that are passed through to the application code 32 by the application wrapper 300.

For example, the operating system 400 may generate an "onResume" event which is intercepted by the application wrapper 300. If the logic in the application wrapper 300 determines that the application 302 is not authorized to resume, then the application wrapper 300 blocks the event by not forwarding it to the responsive function in the application code 302.

The application wrapper 300 may also monitor (e.g., intercept) application programming interface (API) calls made by the application code 302 to the operating system 400 or other resources of the user terminal 100. The application code 302 issues an API call to request services from the operating system 400 or other resources. For example, an API call may be used to turn on a camera, to read data from storage, to display an image on a screen, to pass data to another application (e.g., to an encryption application, communication application, etc.), or to invoke any other functionality provided by the operating system 400.

The application wrapper 300 may pass the API call along to the operating system 400 or other resource. Before the API call is passed to the operating system 400, the logic of the application wrapper 300 determines if any action needs to be taken in response to the API call and may also determine whether or not to pass the API call along to the operating system 400 or other resource.

In general, the application wrapper 300 includes executable code that monitors and/or controls behavior of the application code 302 by intercepting one or more API calls by the application code 302, executes monitoring and/or control code in response to the API call, and thereafter returns control to the application code 302 and/or passes the API call to the operating system 400 or other resource for processing.

For example, in case the application wrapper 300 is designed to limit access to a feature or resource on the user terminal 100 during a designate time frame the application wrapper 300 may intercept an API call from the application code 302 that invokes the feature and, if the API call is made outside the designated time frame, block access to the resource by preventing the API call from reaching the operating system 400 or other resource instead of passing the API call to the operating system 400 or other resource. API calls and other operations that can be performed by an application to obtain access to a resource of the user terminal 100 are more generally referred to as "requests" for convenience of reference. The application wrapper 300 can therefore "block" access by a request from the application code 302 to a resource of the user terminal 100 by preventing the request (e.g., API call) from reaching the operating system 400 or other resource.

Figure 5:
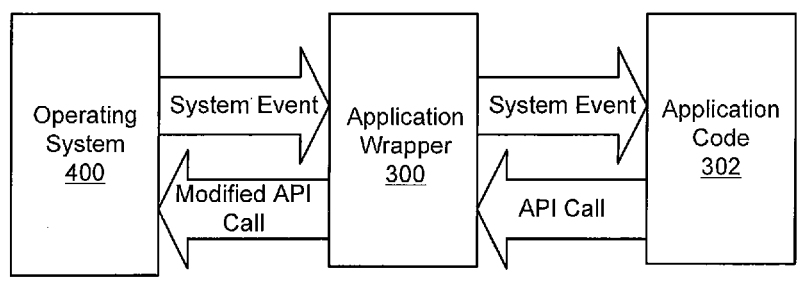

FIG. 5 illustrates the relationship between the operating system 400, the application wrapper 300 and the application code 302 in more detail. In particular, the application wrapper 300 includes logic that determines how intercepted system events and API calls are processed by the application wrapper 300.

As shown in the example of FIG. 5, the application wrapper 300 intervenes between the operating system 400 and the application code 302 and filters and/or operates on system events and API calls passing between the operating system 400 and the application code 302. When a system event is generated and sent to the application code 302 by the operating system 400, a monitoring function in the application wrapper 300 intercepts the system event and passes it to the logic. The logic determines how to respond to the system event and whether or not to pass the system event along to the application code 302.

A monitoring function in the application wrapper 300 listens for API calls from the application code 302, and passes the API calls to the wrapper logic 300. The wrapper logic 300 determines how to respond to the API call, whether to modify the API call, and whether or not to pass the API call or the modified API call (or other type of request) along to the operating system 400.

The monitoring function can also perform measurements of latency, wait time, processor bandwidth availability, memory space availability, network communication bandwidth availability, and/or availability of various defined resources which the application seeks to access in accordance with various embodiments disclosed herein. The monitoring function can generate the state performance metrics based on such measurements. Each of the state performance metrics indicates a measurement of performance of one of a plurality of operational states of an application processed by the user terminal 100.

For example, assume that the application code 16 issues a system log API call to access a network server through a network interface of the user terminal and the Internet. The wrapper logic can intercept API call and determine whether to allow the application to access the network interface. When allowed, the monitoring function can monitor how long the application has waited in an operational state without having receive a response from the network server, monitor a latency between sending a request to the network server and receiving a response from the network server, and/or perform other measurements as described herein. The monitoring function can generate a state performance metric based on the measurement(s), and communicate the state performance metric to the application analysis computer 150 through the radio access network 160 and the network 162.

It will be appreciated that many different types of wrapping/instrumentation tools are offered by various vendors. For example, application monitoring tools are available, such as Flurry, CA Mobile Application Analytics, and Tealeaf. Testing tools, such as IBM Rational Test Workbench Mobile, MonkeyTalk, Jamo, SeeTest and Squish are also available, while management applications are also available, such as CA Mobile Application Management, AirWatch, MobileIron and Fibrelink. In some cases, it is desirable to apply two different wrapping applications to a single application program so that, for example, the application can be both monitored and managed simultaneously.

Figure 6:
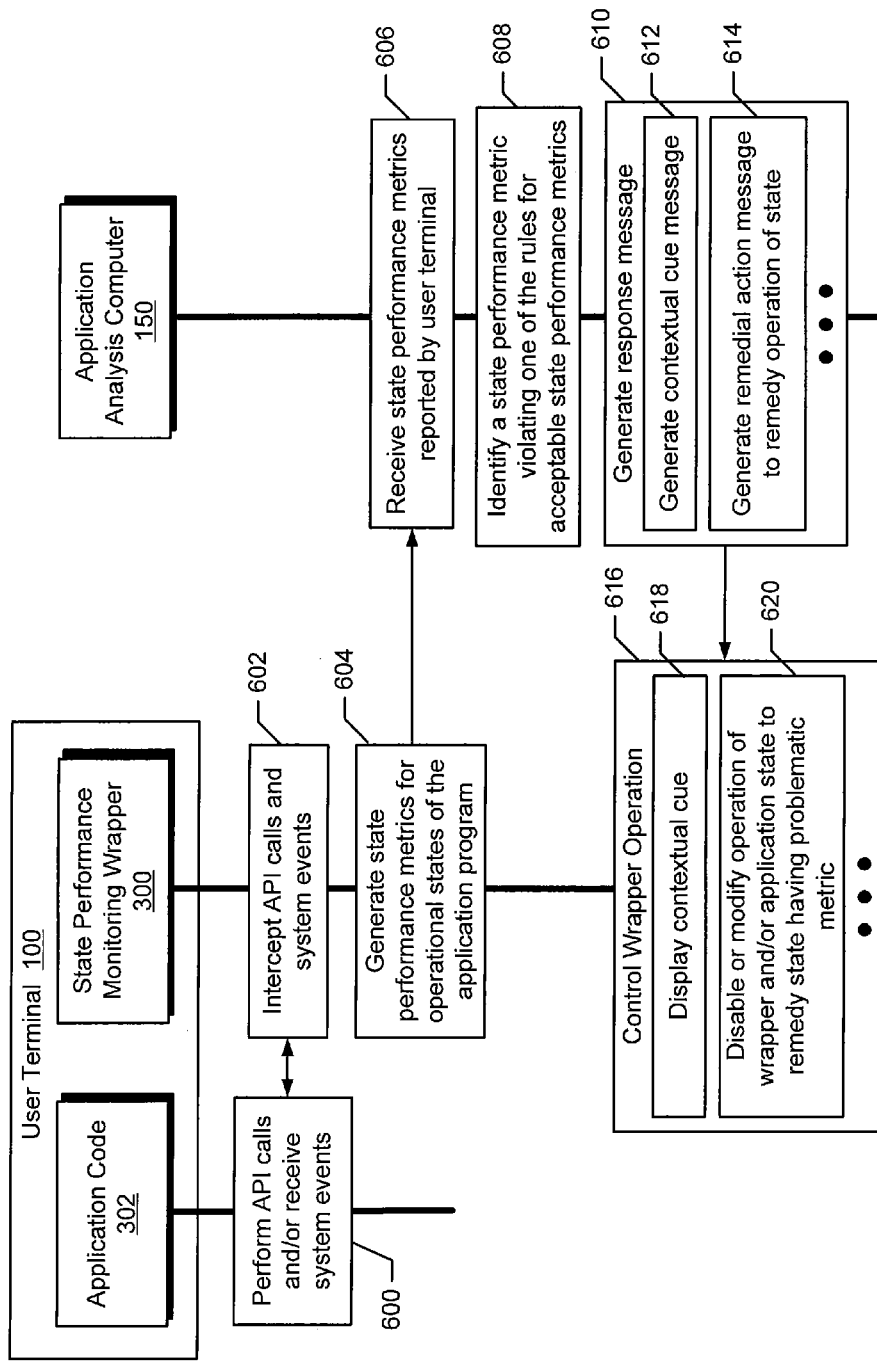
FIG. 6 is a combined data flow diagram and flowchart of operations by a user terminal and an application analysis computer for generating rules for acceptable state performance metrics from an application and providing contextual insights and/or controlling operation based on the rules, in accordance with some embodiments of the present disclosure.

Further example embodiments of the present disclosure are now described in the context of FIG. 6, which is a combined data flow diagram and flowchart of operations by a user terminal 100 and an application analysis computer 150 for generating rules for acceptable state performance metrics from an application and providing contextual insights and/or control operation based on the rules.

Referring to FIG. 6, the application code (application) 302 performs an API call (block 600) to an operating system. Although various embodiments are described in the context of API calls, the embodiments may alternatively or additionally be used to intercept and measure system events provided by an operating system to the application 302. The wrapper 300 intercepts (block 602) the API call, and may forward the API call to the operating system for processing. The operating system may process API call by providing the API call to or reading data from a resource of the user terminal 100, and the resource may provide a response which is intercepted and forwarded through the wrapper 300 to the application 302. The wrapper 300 generates (block 604) a state performance metric based on measurements of the wait time, response latency, and/or other operation measured for the API call is processed, and communicates the state performance metric to the application analysis computer 150. The wrapper 300 can similarly generate a state performance metric based on measurements of performance of the application when a system event is being provided to the application 302. As explained above, the state performance metric indicates a measurement of performance of one of a plurality of operational states of an application processed by the user terminal 100.

The application analysis computer 150 receives (block 606) the state performance metric reported by the user terminal 100, and identifies (block 608) when the state performance metric violates a rule for acceptable operational state performance of the application. According to one of the rules disclosed above, the application analysis computer 150 determines that a state performance metric reported by the user terminal 100 violates a rule when the state performance metric indicates that the application has waited a time duration that exceeds a maximum wait time defined by the rule without having received a response to the API call. The application analysis computer 150 generates (block 610) a response message that is communicated to the user terminal 100 responsive to the determination that the state performance metric violates the rule. The user terminal 100 receives the response message and controls (block 616) operation of the application 302 during the operational state responsive to content of the response message.

In some embodiments, the user terminal 100 communicates the state performance metrics to the application analysis computer 150 in messages. Each of the messages contains an identifier for one of the operational states of the application and a state performance metric for the operational state. The application analysis computer 150 retrieves a rule from among a plurality of rules stored in the repository 120 using the identifier contained in the message for the operational state of the application 302.

In one embodiment, responsive to the rule being violated, the application analysis computer 150 generates (block 612) and communicates to the user terminal 100 a contextual cue message containing information identifying a reason that the state performance metric reported by the user terminal 100 violates the rule for acceptable operational state performance of the application 302. The wrapper 300 receives the contextual cue message and displays (block 618) on a display device of the user terminal 100 a message generated based on content of the contextual cue message.

Figure 8:
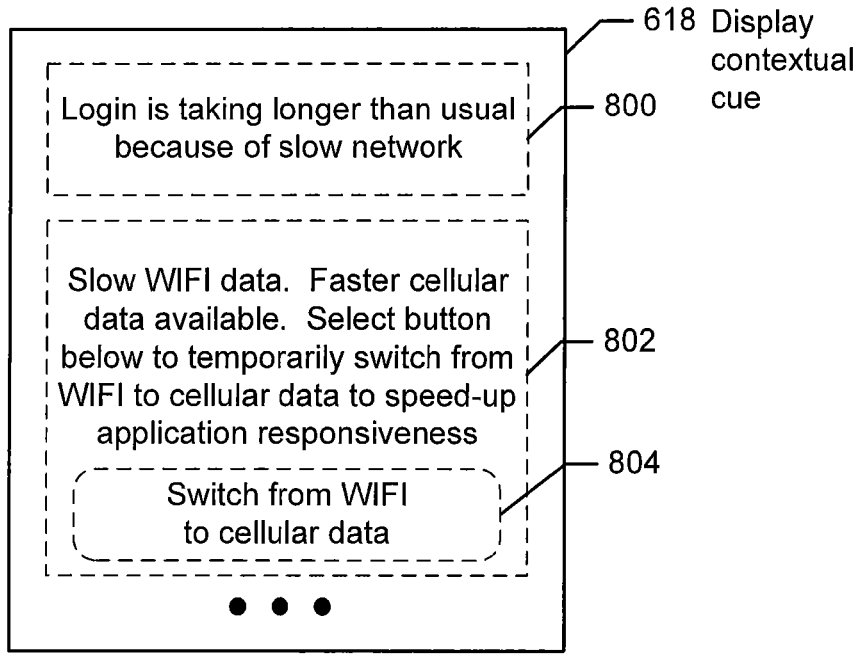
FIGS. 8 and 9 illustrated example contextual cues that can be displayed on a display device of a user terminal and associated operations in accordance with some embodiments of the present disclosure.

FIG. 8 illustrates an example contextual cue message 618 that is displayed by the wrapper 300 on a display device of the user terminal 100. The application analysis computer 150 determines based on violation of a rule that an operational state of an application login process is taking longer than a maximum allowed time due to less than a threshold amount of network bandwidth being available between the user terminal 100 and a login authorization network node used by the application 302 to authenticate login credentials of the user. The computer 150 responsively generates a contextual cue that is communicated to the user terminal 100 for display on a display device. The example contextual cue displayed in region 800 of a display device explains to a user that the "login is taking longer than usual because of a slow network."

In another embodiment, responsive to the rule being violated, the application analysis computer 150 generates (block 614) and communicates to the user terminal 100 a remedial action message. The user terminal 100 then controls operation of the application responsive to the remedial action message.

In the further example of FIG. 8, an alternate contextual cue message is displayed in region 802 by the wrapper 300 in region 802, to explain to a user that the WIFI data connection is slow and a faster cellular data connection is available. Moreover, the displayed message may contain a user selectable remedial action. The illustrated user selectable remedial action is an offer to allow the user to select a soft button 804 displayed on a touch sensitive interface to temporarily switch from a WIFI data connection to a cellular data connection for communication with a networked resource in order to speed up the application responsiveness during the login process. The soft button 804 may be displayed responsive to the wrapper 300 receiving the corresponding remedial action message from the application analysis computer 150. In this manner, the wrapper 300 can display an explanation of the underlying basis for a problem experienced by the application 302 and, moreover, can provide a temporary or permanent remedy to that problem for selection by a user. In one embodiment, the wrapper 300 is configured to temporarily switch from the WIFI data connection to the cellular data connection for use by the application during only the operational state having the problem and, thereafter, constrained the application to using the WIFI data connection. Such temporary switching may be particularly advantageous when the user incurs cellular data roaming charges, such as while traveling in foreign countries. The user may thereby selectively consider and allow such mode switching to allow expedited or further operation of an application state the user decides has sufficient value or importance to justify the consequential effect of allowing the switching.

In one embodiment, the application analysis computer 150 determines, based on the state performance metric received from the user terminal 100 violating a rule defined for the operational state, that the wrapper 300 is the root cause of an operational problem with the application operational state because the wrapper 300 is blocking an API call from the application 302 to a resource of the user terminal 100 that is necessary for operation of the operational state. The computer 150 responsively generates the remedial action message to contain a command to disable interception by the wrapper 300 of the API call and/or other API calls from the application 302 during the operational state identified by the identifier in the message from the user terminal 100 containing the state performance metric. Responsive to the command, the wrapper 300 disables or modifies (block 620) its operations to intercept the API call and/or other API calls from the application 302 during the one of the operational states identified by the identifier received in the remedial action message.

In another embodiment, the application analysis computer 150 determines, based on the state performance metric received from the user terminal 100 violating a rule defined for the operational state, that the application operational state is having a problem because a resource of the user terminal 100 is presently unavailable to be accessed by the application 302 via, for example, an API call. The computer 150 may furthermore determine based on the state performance metric whether the access is due to the wrapper 300 blocking access to the resource, due to the processor of the user terminal 100 having insufficient processing bandwidth to allow timely access to the resource, due to the network connection to the resource being unavailable or having insufficient bandwidth, etc. The computer 150 responsively communicates to the wrapper 300 a response message (e.g., a remedial action message) containing a defined value that the wrapper 300 is to provide to the application 302. The defined value imitates an acceptable response to the application 302 from the API call to the resource. The wrapper 300 receives the response message and responsively provides the defined value to the application 302 as the acceptable response from the API call to the resource. Thus, although the operational state of the application 302 is presently unable to access a necessary resource, the application analysis computer 150 in cooperation with the wrapper 300 to provide a defined value to the application 302 that appears to have come from the resource and which is known, based on the rule, to be an acceptable response to the application 302. In one embodiment, the defined value is determined and stored in the repository 120 during generation of the rules, and may be updated over time based on values that are observed to be provided by the subject resource during run-time operation of the wrapped application.

Figure 9:
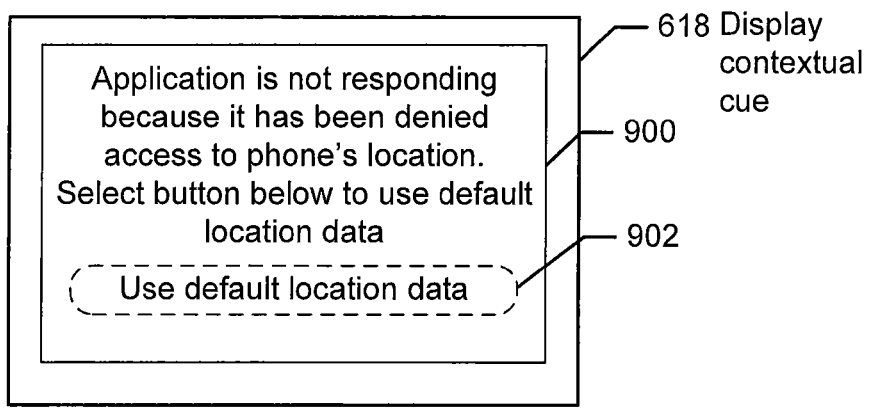

FIG. 9 illustrates another example contextual cue message 618 that is displayed on a display device of the user terminal 100. The application analysis computer 150 determines based on violation of a rule that the application 302 is not responding to the user because the application 302 has been denied access to the user terminal's (phone's) present location, e.g., because no GPS data is available from a GPS resource and/or a user-defined permission has denied the application's 302 requested access to a location service of the user terminal 100. The computer 150 responsively generates a contextual cue that is communicated to the user terminal 100 for display. The wrapper 300 on the user terminal 100 displays a message 900 explaining the underlying basis for the application problem and displays a soft button 902 on a touch sensitive interface. The soft button 902, when selected by the user, causes the wrapper 300 to provide default location data to the application 302 to imitate a response being provided from the location service that is presently unavailable to the application 302. In this manner, the wrapper 300 can display an explanation of the underlying basis for a problem experienced by the application 302 and, moreover, allows the user to remedy the problem by providing an acceptable response to the application on behalf of the unavailable resource to cause the application to continue processing without further delay or error. In one embodiment, the default location data is determined and stored in the repository 120 during generation of the rules. In another embodiment, the default location data is determined based on one or more default location data responses from the GPS resource to one or more access requests by the user terminal.

Figure 7:
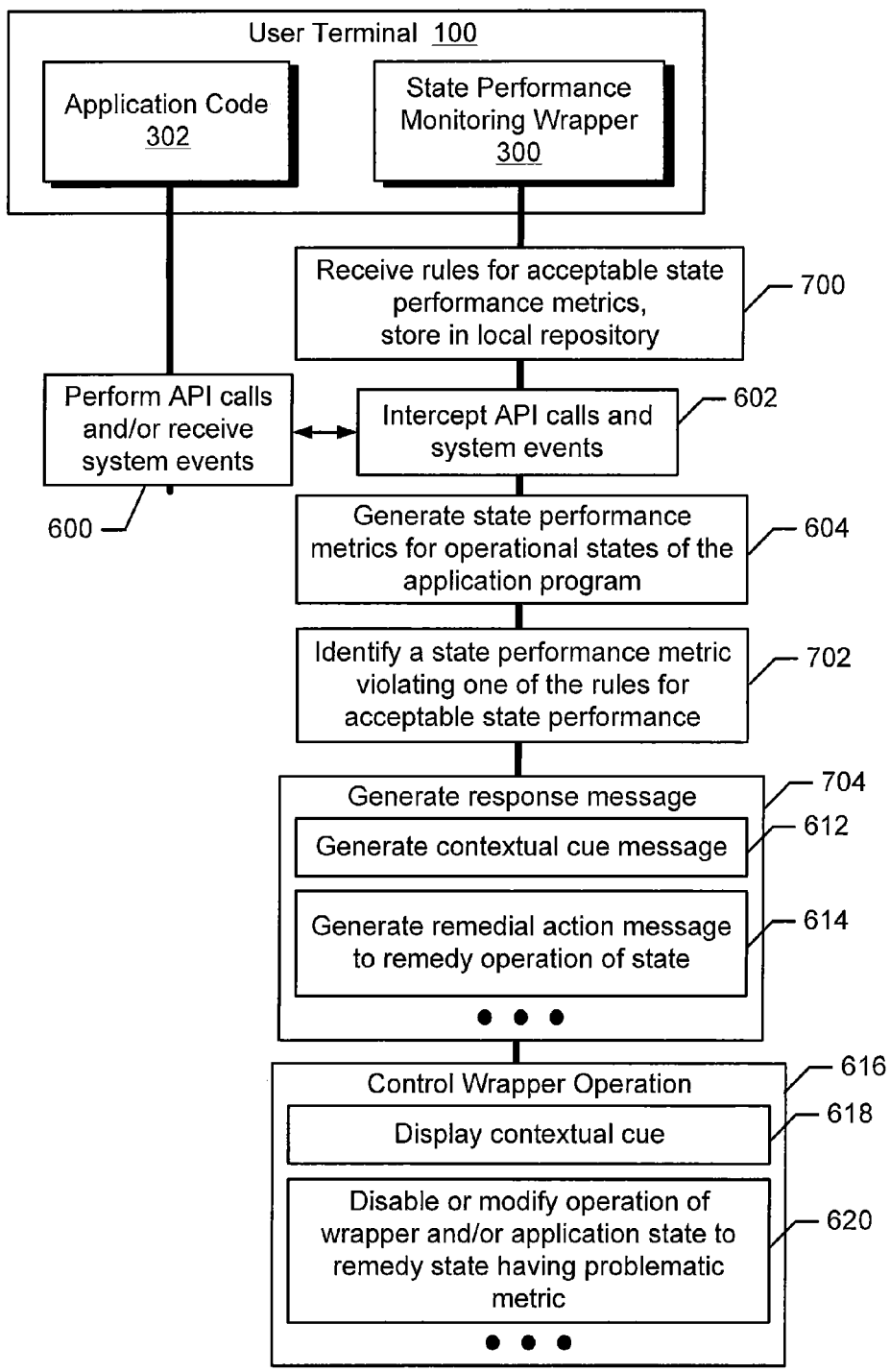
FIG. 7 is a combined data flow diagram and flowchart of operations by a user terminal for generating rules for acceptable state performance metrics from an application and providing contextual insights and/or controlling operation based on the rules, in accordance with some embodiments of the present disclosure.

Various embodiments have been described in the context of the application analysis computer 150 identifying (block 608) that a state performance metric violates a rule and responsively generating (block 610) the response message. However, in some other embodiments the user terminal 100 performs operations to identify that a state performance metric violates a rule and operations to generate a response message that controls operation of the wrapper 300 in the application 302. FIG. 7 is a combined data flow diagram and flowchart of operations by the user terminal 100 for generating rules for acceptable state performance metrics from the wrapper 300 and providing contextual insights and/or control operation based on the rules, in accordance with some embodiments of the present disclosure. Some of the operations shown in FIG. 7 may be performed as described above regarding the blocks shown in FIG. 6 having the same reference numbers. The description of blocks having the same reference numbers as FIG. 6 is not repeated here for sake of brevity.

Referring to FIG. 7, the wrapper 300 receives (block 700) rules that define acceptable state performance metrics, from the repository 120 of the application analysis computer 150. The wrapper 300 stores the rules in a local repository within the user terminal 100. The application code 302 can perform (block 600) API calls to resources of the user terminal 100 and the wrapper 300 can intercept (block 602) the API calls. The wrapper 300 can similarly intercept system events provided by the operating system to the application 302. The wrapper 300 generates (block 604) state performance metrics. Moreover, the wrapper 300 identifies (block 702) a state performance metric that violates one of the rules for acceptable state performance. The wrapper 300 responsively generates (block 704) a response message, which may include generating (block 612) a contextual cue message and/or generating (block 614) a remedial action message to remedy problematic operation of an application state.

The wrapper 300 controls (block 616) its operation and can further control operation of the application code 302 by displaying (block 618) a contextual cue on display device and/or by disabling or modify (block 620) operation of the wrapper 300 and/or disabling or modifying an application state to remedy the state having the problematic state performance metric.

Figure 10:
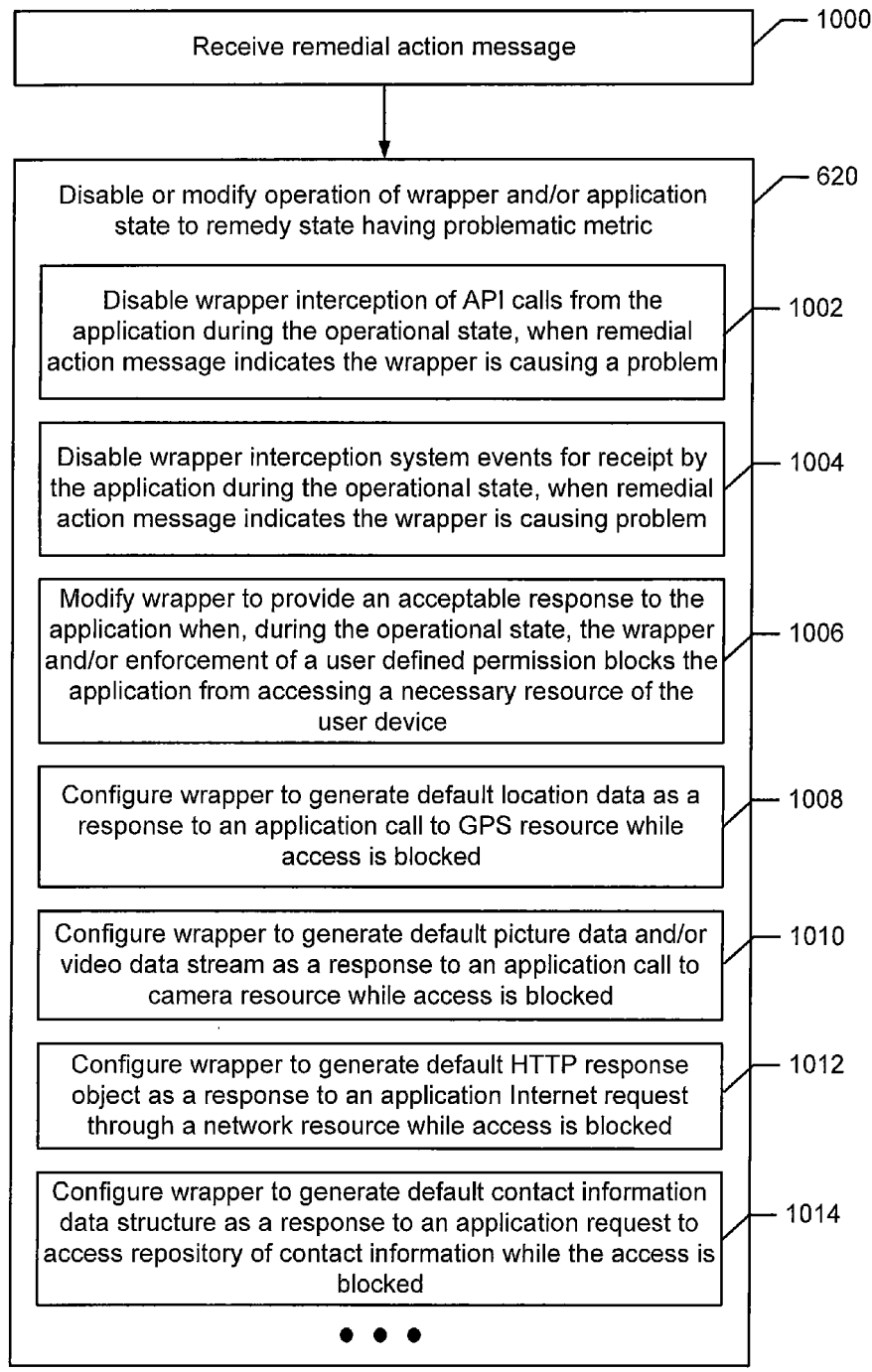
FIG. 10 is a flowchart of operations that can be performed by a user terminal to remedy a problematic operational state of an application due to unavailability of a resource in accordance with some embodiments of the present disclosure.

FIG. 10 is a flowchart of further operations that can be performed by the user terminal 100 to remedy a problematic operational state of an application due to unavailability of a resource in accordance with some embodiments of the present disclosure. Referring to FIG. 10, a remedial action message is received (block 1000) which causes disabling or modification (block 620) of operation of a feature of the wrapper 300 and/or an operational state of the application 302 associated with the problematic state performance metric. One or more of the illustrated operations can be performed to carry out the disabling or modification (block 620).

In one embodiment, the wrapper 300 disables (block 1002) interception of API calls from application 302 during operational state responsive to the remedial action message indicating that the wrapper 300 is causing a problem.

For example, developers typically code an application program to operate based on the assumption that if during setup of the application a set of permissions is granted (e.g., based on user defined preferences or selections) for the application to access corresponding resources of user devices, then the application will have access to those resources whenever requested by the application. However, the application 302 can be wrapped by the wrapper 300 written by an entirely different entity, and the wrapper 300 can exert unexpected control over those access requests. The wrapper 300 can block a request from a feature of the application 302 to access a particular resource when an access control rule used by the wrapper 300 is satisfied. Such blocking of resource access can trigger unexpected operational behavior from the application 302 and result in erroneous operation during the access operational state. The erroneous operation can include ceasing further operations while hanging in an infinite loop or wait state while awaiting a requested response from the resource. Another erroneous operation can include terminating operation due to a mathematical error from processing a register value or memory value that is erroneously interpreted as a valid response from the requested resource. Still another erroneous operation can include causing a change in a conditional branch (e.g., the blocked access erroneously affects the branch condition) during processing of operations of the application program due to the nonresponse from the requested resource. One or more of these problems can be overcome by the operation of block 1002 causing the wrapper 300 to disable interception of API calls from the application 302 during the operational state responsive to the remedial action message indicating that the wrapper 300 is causing a problem during that operational state of the application.

In another embodiment, the wrapper 300 disables (1004) interception of system events received by the application 302 during the operational state responsive to the remedial action message indicating that the wrapper 300 is causing a problem. In another embodiment, the wrapper 300 provides (block 1006) an acceptable response to the application 302 when, during the operational state, the wrapper 300 and/or the operating system enforcing a user-defined permission blocks the application 302 from accessing a necessary resource of the user device 100.

In another embodiment, the wrapper 300 generates (block 1008) default location data as a response to an application call to a GPS resource while access to the GPS resource is blocked or otherwise unavailable. For example, a restaurant locator application assumes that the device's location from a GPS resource is available all of the time or, if it is turned-off, the application is notified of that status and configured to then prompt the user to turn-on the GPS resource. However the wrapper 302 can dynamically control whether the application is allowed access to the GPS resource. When a request from the application 302 to the GPS resource is blocked by the wrapper 300, the application 302 can exhibit erroneous operation. In accordance with this embodiment, the wrapper 300 provides the default location data as a response to an application call to a GPS resource while access to the GPS resource is blocked or otherwise unavailable. The default location may be defined by a user (e.g., such as a work address that the user doesn't mind sharing) or may be based on a previous location that was recorded while access to the GPS resource was available, such as a location reported by the GPS resource responsive to a previous request from the application.

In another embodiment, the wrapper 300 generates (block 1010) default picture data and/or video stream data as a response to an application called to a camera resource while access to the camera resource is blocked or otherwise unavailable. Thus, for example, a photo capture or editing application may always expect that the device's camera resource to be available for its operations. However the wrapper 300 can dynamically control whether the application 302 is allowed access to the camera resource. When a request from the application 302 to the camera resource is blocked, the application 302 can exhibit erroneous operation (e.g., trigger an operating system of the user device to force shutdown due to erroneous application operation). In accordance with this embodiment, the wrapper 300 provides the default picture data and/or video stream data as a response to the application 302 while access to the camera resource is blocked or otherwise unavailable. The default picture data and/or video data stream may be defined by the user and/or may be based on previous picture data and/or video data stream that was recorded while access to the camera resource was available, such as picture data and/or video data stream received from the camera resource responsive to a previous request from the application.

In another embodiment, the wrapper 300 generates (block 1012) a default HTTP response object as a response to an application Internet request through a network resource while access to the network resource is blocked or otherwise unavailable. In another embodiment, the wrapper 300 generates (block 1014) a default contact information data structure as a response to an application request to access a repository of contact information while such access is blocked or otherwise unavailable.

Accordingly, one or more of the operations of block 620 can be performed to configure the wrapper 300 to provide an acceptable response to the application 302 on behalf of the resource that is presently unavailable to the application 302. The default response or other generated response to the application 302 can enable the application to continue processing through the present application state or subsequent application states without further problem.

Figure 11:
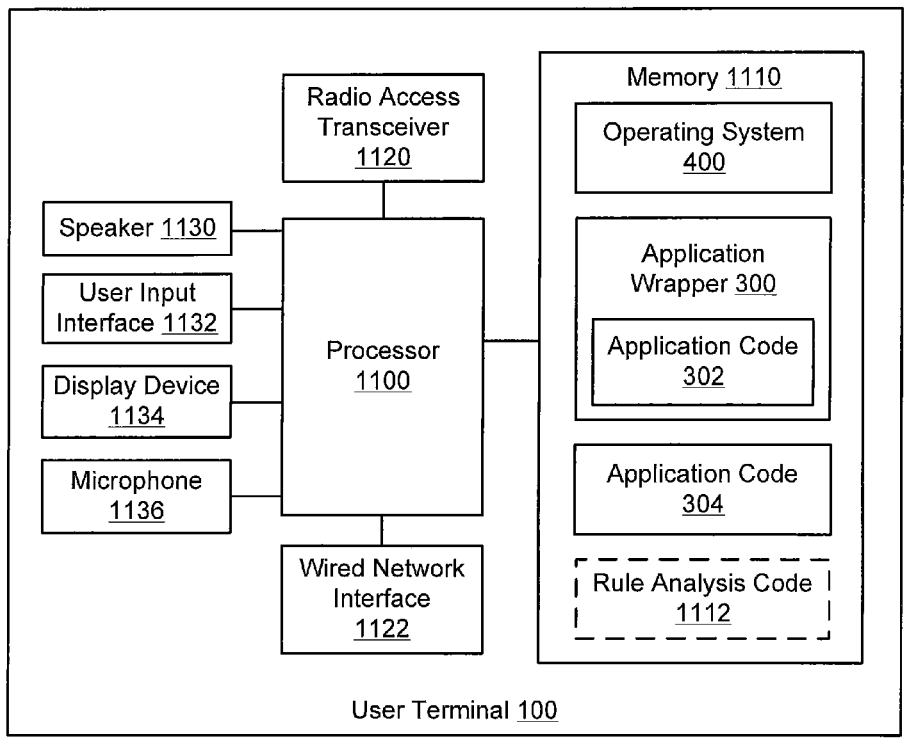
FIG. 11 is a block diagram of a user terminal configured according to some embodiments of the present disclosure.

FIG. 11 is a block diagram of a user terminal 100 configured according to some embodiments of the present disclosure. Referring to FIG. 1, the mobile terminal 100 includes a processor 1100, a memory 1110, and a network interface which may include a radio access transceiver 1120 and/or a wired network interface 1122 (e.g., Ethernet interface). The radio access transceiver 1120 can include, but is not limited to, a LTE or other cellular transceiver, WLAN transceiver (IEEE 802.11), WiMax transceiver, or other radio communication transceiver configured to communicate with the application analysis computer 150 via a radio access network.

The processor 1100 may include one or more data processing circuits, such as a general purpose and/or special purpose processor, such as a microprocessor and/or digital signal processor. The processor 1100 is configured to execute computer program code in the memory 1110, described below as a non-transitory computer readable medium, to perform at least some of the operations described herein as being performed by a user terminal. The computer program code may include an operating system 400, a plurality of application programs 302 and 304, an application wrapper 300, and rule analysis code 1112. The application wrapper 300 encapsulates and generates performance metrics based on operational states of the application 302. The rule analysis code 1112 may process data from measurements to generate one or more state performance metrics for processing and reporting according to one or more of the embodiments herein. The user terminal 100 may further include a speaker 1130, user input interface 1132 (e.g., touch screen, keyboard, keypad, etc.), a display device 1134, and a microphone 1136.

As used herein, the term "user terminal" may include a satellite or cellular radiotelephone; a PDA or smart phone that can include a radiotelephone, pager, Internet/intranet access, Web browser, organizer, calendar and/or a global positioning system (GPS) receiver; and a tablet computer, laptop computer, desktop computer that includes a network interface allowing communication with an application analysis computer via a data network (e.g., private network and/or a public network such as the Internet).

Figure 12:
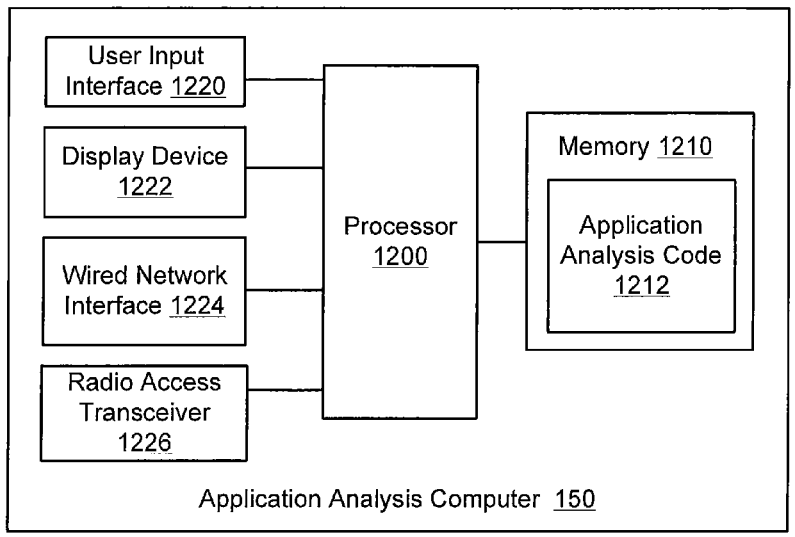
FIG. 12 is a block diagram of an application analysis computer configured according to some embodiments of the present disclosure.

FIG. 12 is a block diagram of an application analysis computer 150 configured according to some embodiments of the present disclosure. The application analysis computer 150 includes a processor 1200, a memory 1210, and a network interface which may include a radio access transceiver 1226 and/or a wired network interface 1224 (e.g., Ethernet interface). The radio access transceiver 1226 can include, but is not limited to, a LTE or other cellular transceiver, WLAN transceiver (IEEE 802.11), WiMax transceiver, or other radio communication transceiver configured to communicate with the user terminal 100 via a radio access network.

The processor 1200 may include one or more data processing circuits, such as a general purpose and/or special purpose processor (e.g., microprocessor and/or digital signal processor) that may be collocated or distributed across one or more networks. The processor 1200 is configured to execute computer program code in the memory 1210, described below as a non-transitory computer readable medium, to perform at least some of the operations described herein as being performed by an application analysis computer. The computer program code may include application analysis code 1212 configured to receive and process state performance metrics in accordance with one or more embodiments herein. The application analysis computer 150 may further include a user input interface 1220 (e.g., touch screen, keyboard, keypad, etc.) and a display device 1222.

FURTHER DEFINITIONS AND EMBODIMENTS

In the above-description of various embodiments of the present disclosure, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented in entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product comprising one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

It is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Like reference numbers signify like elements throughout the description of the figures.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The invention claimed is:

1. A method, comprising:
    performing operations as follows on a processor of an application analysis computer:
    receiving state performance metrics reported by user terminals via a data network, each of the state performance metrics indicating a measurement of performance of one of a plurality of operational states of an application processed by one of the user terminals;
    determining when one of the state performance metrics reported by one of the user terminals violates a rule for acceptable operational state performance of the application;

communicating a response message to the one of the user terminals responsive to the determination that the one of the state performance metrics violates the rule;

receiving state performance metrics from pre-wrapper run-time tests of the application processed by a plurality of user terminals having different hardware and software platforms, each of the state performance metrics indicating a measurement of performance of one of a plurality of operational states of the application while operating free of any application wrapper configured to intercept application programming interface (API) calls from the application to resources of the user terminals;

for each of the operational states of the application, generating a rule for acceptable performance of the operational state of the application based on the state performance metrics for the operational state received from the pre-wrapper run-time tests; and storing in a repository the rules each associated with an identifier for a corresponding one of the operational states of the application tested by the pre-wrapper run-time tests.

2. The method of claim 1, further comprising:

updating the rules over time based on state performance metrics received in reports from the user terminals while the application is wrapped by an application wrapper configured to intercept the API calls from the application to resources of the user terminals.

3. The method of claim 2, further comprising:

communicating the rules with identifiers for corresponding ones of the operational states of the application to the user terminals for local determination of when one of the state performance metrics determined by one of the user terminals violates one of the rules for acceptable operational state performance of the application.

4. The method of claim 1, wherein the, for each of the operational states of the application, generating a rule for acceptable performance of the operational state of the application based on the state performance metrics for the operational state received from the pre-wrapper run-time tests, comprises:

mathematically combining the state performance metrics for the operational state to generate a threshold value representing a boundary limit for acceptable performance of the operational state.

5. The method of claim 4, wherein:

the threshold value represents a maximum wait time the application is to wait to receive a response to an API call by the application; and the determining when one of the state performance metrics reported by one of the user terminals violates a rule for acceptable operational state performance of the application, comprises:

determining when the one of the state performance metrics reported by the one of the user terminals indicates that the application has waited a time duration that exceeds the maximum wait time without having received a response to the API call.

6. The method of claim 1, wherein:

the receiving state performance metrics reported by user terminals via a data network, comprises:

receiving a message from one of the user terminals, the message containing an identifier for one of the operational states of the application and a state performance metric for the one of the operational states; and the determining when one of the state performance metrics reported by the one of the user terminals violates a rule for acceptable operational state performance of the application, comprises:

retrieving the rule from the repository using the identifier contained in the message for the one of the operational states of the application.

7. The method of claim 1, wherein the communicating a response message to the one of the user terminals responsive to the determination that the one of the state performance metrics violates the rule, comprises:

communicating to the one of the user terminals a contextual cue message containing information identifying a reason that the one of the state performance metrics reported by the one of the user terminals violates the rule for acceptable operational state performance of the application.

8. A method, comprising:

performing operations as follows on a processor of an application analysis computer:

receiving state performance metrics reported by user terminals via a data network, each of the state performance metrics indicating a measurement of performance of one of a plurality of operational states of an application processed by one of the user terminals;

determining when one of the state performance metrics reported by one of the user terminals violates a rule for acceptable operational state performance of the application; and communicating a response message to the one of the user terminals responsive to the determination that the one of the state performance metrics violates the rule, wherein:

the receiving state performance metrics reported by user terminals via a data network, comprises:

receiving a message from one of the user terminals, the message containing an identifier for one of the operational states of the application and a state performance metric for the one of the operational states; and the communicating a response message to the one of the user terminals responsive to the determination that the one of the state performance metrics violates the rule, comprises:

communicating to the one of the user terminals a remedial action message containing a command to disable interception by an application wrapper of application programming interface calls from the application during the one of the operational states identified by the identifier.

9. A method, comprising:

performing operations as follows on a processor of an application analysis computer:

receiving state performance metrics reported by user terminals via a data network, each of the state performance metrics indicating a measurement of performance of one of a plurality of operational states of an application processed by one of the user terminals;

determining when one of the state performance metrics reported by one of the user terminals violates a rule for acceptable operational state performance of the application; and communicating a response message to the one of the user terminals responsive to the determination that the one of the state performance metrics violates the rule, wherein:

the receiving state performance metrics reported by user terminals via a data network, comprises:
receiving a message from one of the user terminals, the message containing an identifier for one of the operational states of the application and a state performance metric for the one of the operational states; and
the communicating a response message to the one of the user terminals responsive to the determination that the one of the state performance metrics violates the rule, comprises:
communicating to an application wrapper executed by the one of the user terminals a response message containing a defined value that the application wrapper is to provide to the application, wherein the application wrapper intercepts application programming interface (API) calls from the application to resources of the user terminals, the application wrapper is determined by the violation of the rule to be blocking an API call from the application to one of the resources during the one of the operational states, the defined value imitates an acceptable response to the application from the API call to the one of the resources.

10. A method, comprising:
performing operations as follows on a processor of a user terminal:
generating state performance metrics, each of the state performance metrics indicating a measurement of performance of one of a plurality of operational states of an application processed by the user terminal;
communicating the state performance metrics to an application analysis computer via a data network;
receiving a response message responsive to one of the state performance metrics for one of the operational states being determined to violate a rule for acceptable operational state performance of the application; and
controlling operation of the application during the one of the operational states responsive to content of the response message, wherein the controlling comprises:
generating a contextual cue message based on content of the response message, the contextual cue message identifying a reason that the one of the state performance metrics reported by the user terminal violates the rule for acceptable operational state performance of the application; and
displaying the contextual cue message through a display device of the user terminal.

11. The method of claim 10, wherein the receiving a response message responsive to one of the state performance metrics for one of the operational states being determined to violate a rule for acceptable operational state performance of the application, comprises:
receiving the response message from the application analysis computer responsive to the one of the state performance metrics for the one of the operational states being determined by the application analysis computer to violate the rule for acceptable operational state performance of the application.

12. The method of claim 10, wherein the receiving a response message responsive to one of the state performance metrics for one of the operational states being determined to violate a rule for acceptable operational state performance of the application, comprises:
determining by the processor of the user terminal that the one of the state performance metrics violates the rule for acceptable operational state performance of the application; and
generating by the processor of the user terminal the response message responsive to the determination that the one of the state performance metrics violates the rule for acceptable operational state performance of the application.

13. The method of claim 12, wherein:
the generating state performance metrics, each of the state performance metrics indicating a measurement of performance of one of a plurality of operational states of an application processed by the user terminal, comprises:
generating the state performance metrics based on latency for a response to be provided to an application programming interface call by the application;
the determining that the one of the state performance metrics violates the rule for acceptable operational state performance of the application, comprises:
determining that the one of the state performance metrics exceeds a defined maximum latency allowed for a response to be provided to the application programming interface call by the application.

14. The method of claim 12, wherein:
the generating state performance metrics, each of the state performance metrics indicating a measurement of performance of one of a plurality of operational states of an application processed by the user terminal, comprises:
generating the state performance metrics based on elapsed time waiting without having received a response to an application programming interface call by the application;
the determining that the one of the state performance metrics violates the rule for acceptable operational state performance of the application, comprises:
determining that the one of the state performance metrics exceeds a defined maximum wait time the application is to wait to receive a response to the application programming interface call.

15. A method, comprising:
performing operations as follows on a processor of a user terminal:
generating state performance metrics, each of the state performance metrics indicating a measurement of performance of one of a plurality of operational states of an application processed by the user terminal;
communicating the state performance metrics to an application analysis computer via a data network;
receiving a response message responsive to one of the state performance metrics for one of the operational states being determined to violate a rule for acceptable operational state performance of the application; and
controlling operation of the application during the one of the operational states responsive to content of the response message,
wherein:
the communicating the state performance metrics to the application analysis computer via a data network, comprises:
communicating messages to the application analysis computer, each of the messages containing an identifier for one of the operational states of the application and a state performance metric for the one of the operational states;

the receiving a response message responsive to one of the state performance metrics for one of the operational states being determined to violate a rule for acceptable operational state performance of the application, comprises:
    receiving a remedial action message containing a command and the identifier for the one of the operational states; and
the controlling operation of the application during the one of the operational states responsive to content of the response message, comprises:
    responsive to the command, controlling an application wrapper to disable interception by the application wrapper of application programming interface calls from the application during the one of the operational states identified by the identifier received in the remedial action message.

16. A method, comprising:
performing operations as follows on a processor of a user terminal:
generating state performance metrics, each of the state performance metrics indicating a measurement of performance of one of a plurality of operational states of an application processed by the user terminal;
communicating the state performance metrics to an application analysis computer via a data network;
receiving a response message responsive to one of the state performance metrics for one of the operational states being determined to violate a rule for acceptable operational state performance of the application; and
controlling operation of the application during the one of the operational states responsive to content of the response message,
wherein:
an application wrapper intercepts application programming interface (API) calls from the application to resources of the user terminals, the application wrapper is determined by the violation of the rule to be blocking an API call from the application to one of the resources during the one of the operational states;
the receiving a response message responsive to one of the state performance metrics for one of the operational states being determined to violate a rule for acceptable operational state performance of the application, comprises:
    receiving from the application analysis computer a remedial action message containing a defined value that imitates an acceptable response to the application from the API call to the one of the resources; and
the controlling operation of the application during the one of the operational states responsive to content of the response message, comprises:
    responsive to the remedial action message, controlling the application wrapper to provide the defined value to the application as the acceptable response from the API call to the one of the resources.

17. A method, comprising:
performing operations as follows on a processor of a user terminal:
generating state performance metrics, each of the state performance metrics indicating a measurement of performance of one of a plurality of operational states of an application processed by the user terminal;
communicating the state performance metrics to an application analysis computer via a data network;
receiving a response message responsive to one of the state performance metrics for one of the operational states being determined to violate a rule for acceptable operational state performance of the application; and
controlling operation of the application during the one of the operational states responsive to content of the response message,
wherein:
the receiving a response message responsive to one of the state performance metrics for one of the operational states being determined to violate a rule for acceptable operational state performance of the application, comprises:
    selecting a remedial action based on the rule; and
the controlling operation of the application during the one of the operational states responsive to content of the response message, comprises:
    responsive to the remedial action, controlling an application wrapper to disable interception by the application wrapper of application programming interface calls from the application during the one of the operational states.

18. A method, comprising:
performing operations as follows on a processor of a user terminal:
generating state performance metrics, each of the state performance metrics indicating a measurement of performance of one of a plurality of operational states of an application processed by the user terminal;
communicating the state performance metrics to an application analysis computer via a data network;
receiving a response message responsive to one of the state performance metrics for one of the operational states being determined to violate a rule for acceptable operational state performance of the application; and
controlling operation of the application during the one of the operational states responsive to content of the response message,
wherein:
an application wrapper intercepts application programming interface (API) calls from the application to resources of the user terminals, the application wrapper is determined by the violation of the rule to be blocking an API call from the application to one of the resources during the one of the operational states;
the receiving a response message responsive to one of the state performance metrics for one of the operational states being determined to violate a rule for acceptable operational state performance of the application, comprises:
    determining by the processor of the user terminal a defined value that imitates an acceptable response for the application from the API call to the one of the resources; and
the controlling operation of the application during the one of the operational states responsive to content of the response message, comprises:
    controlling the application wrapper to provide the defined value to the application as the acceptable response from the API call to the one of the resources.

* * * * *